United States Patent [19]

Colineau et al.

[11] Patent Number: 5,335,120
[45] Date of Patent: Aug. 2, 1994

[54] DEVICE FOR READING A SET OF RESISTIVE ELEMENTS FEATURING INTERROGATION AND VOLTAGE STABILIZATION CIRCUITS

[75] Inventors: Joseph Colineau, Bures Sur Yvette; Thierry Valet, Viroflay, both of France

[73] Assignee: Thomson-CSF, Puteaux, France

[21] Appl. No.: 35,068

[22] Filed: Mar. 22, 1993

[30] Foreign Application Priority Data

Mar. 27, 1992 [FR] France ................. 92 03717

[51] Int. Cl.$^5$ .................... G11B 15/12; G11B 5/09
[52] U.S. Cl. .................................. 360/63; 360/46
[58] Field of Search .............. 360/63, 114, 119, 121, 360/113, 66, 46; 358/60; 315/408; 29/603

[56] References Cited

U.S. PATENT DOCUMENTS

| | | | |
|---|---|---|---|
| 4,425,533 | 1/1984 | Colineau et al. | 315/408 |
| 4,438,375 | 3/1984 | Colineau et al. | 315/408 |
| 4,621,281 | 11/1986 | Colineau | 358/60 |
| 4,706,115 | 11/1987 | Colineau et al. | 358/60 |
| 4,816,908 | 3/1989 | Colineau et al. | 358/60 |
| 5,063,467 | 11/1991 | Colineau et al. | 360/119 |
| 5,189,579 | 2/1993 | Colineau | 360/121 |
| 5,227,938 | 7/1993 | Colineau et al. | 360/114 |
| 5,251,088 | 10/1993 | Coutellier et al. | 360/113 |
| 5,282,104 | 1/1994 | Coutellier . | |

FOREIGN PATENT DOCUMENTS 2286461 4/1976 France .
0467736 1/1992 France .

OTHER PUBLICATIONS

IBM Technical Disclosure Bulletin, vol. 17, No. 12, May 1975, pp. 3778-3779, E. G. Lean, et al., "Scanning Tapped Magnetoresistive Sensor."
Patent Abstracts of Japan, vol. 11, No. 298, Sep. 1987, and JP-A-62 089 204, Sato Kenichi, "Reproducing Device for Digital Signal."
Ser. No. 07/651,350, Jun. 15, 1990, abandoned.
Ser. No. 07/631,245 Dec. 20, 1990, abandoned.
Ser. No. 08/047,357, Apr. 19, 1993, pending.
Ser. No. 07/732,796, Jul. 19, 1991, abandoned.
Ser. No. 07/812,128 Dec. 19, 1991, abandoned.
Ser. No. 08/004,650, Jan. 14, 1993, allowed.
Ser. No. 07/966,518, Oct. 23, 1992, pending.
Ser. No. 07/991,592, Dec. 16, 1992, pending.

Primary Examiner—Donald Hajec
Assistant Examiner—Patrick Wamsley
Attorney, Agent, or Firm—Oblon, Spivak, McClelland, Maier & Neustadt

[57] ABSTRACT

In a device for the reading of a set of resistive elements (1.0, ..., 1.n) in which an interrogation potential ($V_0$) is applied at each instant to an element while a reference potential (v) is applied to the other elements, a stabilization circuit (CS) operates to keep the reading ports (L.0, ..., L.n) at the reference potential. The present invention may find particular application to the reading of the elementary magnetoresistive heads of a magnetic reading head.

8 Claims, 2 Drawing Sheets

DEVICE FOR READING A SET OF RESISTIVE ELEMENTS FEATURING INTERROGATION AND VOLTAGE STABILIZATION CIRCUITS

BACKGROUND OF THE INVENTION

1. Field of the Invention

The invention relates to a device for the reading of resistive elements, notably magnetoresistive elements and, especially, magnetoresistive heads arranged in a matrix form.

The invention can be applied, for example to recording on magnetic tapes for computer peripherals, and an object of the invention is the selection and reading of the elements of a multitrack magnetoresistive head with a matrix structure. This device enables the reading, by means of a static head, of several parallel information elements.

2. Description of the Prior Art

Matrix structure magnetoresistive reading heads and their method of selection and reading are described in the French patent applications 2 656 454 and 2 665 010.

These methods operate by associating a preamplifier with each of the rows of heads and, at a given instant, in validating one element in only one of these rows by a selection method applied to the previous column.

In the patent application No. 2 656 454, a non-linearity (saturation of the poles, or angle of the magnetization in the magnetoresistive element) is used.

In the patent application No. 2 665 010, a voltage is applied to the column to be selected, and it is ensured that the current can flow only in the active element of each row, thus leading to the use of an amplifier with low input impedance, such as a transconductance amplifier.

When the resistance of the magnetoresistive elements is low (of the order of 10 ohms or less), as is generally the case with the presently known materials and technologies, the preponderant noise parameter is the noise voltage of the amplifier.

The present invention consists of a method that is better suited to the reading of a matrix of magnetorestrictive sensors, especially when their impedance is low.

SUMMARY OF THE INVENTION

The invention therefore relates to a device for the reading of a set of resistive elements, each comprising an interrogation port that can be connected to an electrical interrogation source and a reading port connected to a voltage detection circuit that enables the resistance of each resistive element to be measured, wherein:

the interrogation circuit successively applies an interrogation potential to the interrogation port of each resistive element while it applies a reference potential to the other resistive elements;

and wherein:

said device comprises at least one voltage stabilization circuit that is connected to the reading ports of the resistive elements and that keeps these ports substantially at the reference potential.

BRIEF DESCRIPTION OF THE DRAWINGS

The different objects and features of the invention shall appear more clearly from the following description, which is given by way of an example, and from the appended figures, of which.

MORE DETAILED DESCRIPTION

Figure 1:
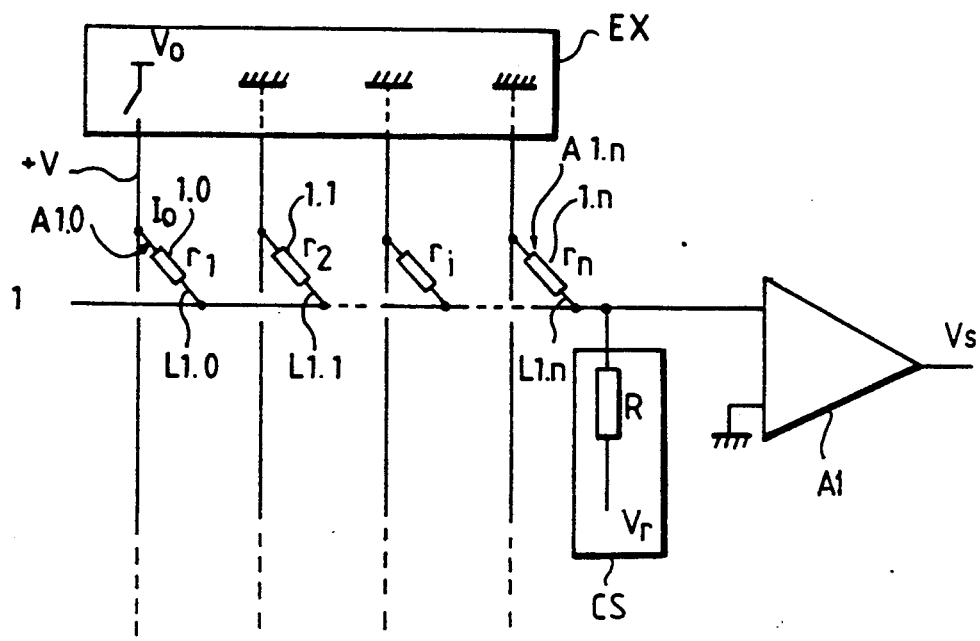
FIG. 1 shows an exemplary embodiment of the device according to the invention.

Referring to FIG. 1, a description shall be given, first of all, of a basic exemplary embodiment of the device of the invention.

This device has a set of resistive elements 1.0, 1.1, ... 1.n that can have different values of resistance.

Each element 1.0 to 1.n has an interrogation port such as A1.0 and a reading port L1.0.

An exploration circuit EX enables the successive application, to each interrogation port (A1.0 to A1.n), of an interrogation potential $V_0$ while it applies a potential $v=0$ volt to the other interrogation ports. According to the example of FIG. 1, at a given instant, the circuit EX applies the potential $V_0$ to the interrogation port A1.0 of the element 1.0 while it applies a potential $v=0$ to the other interrogation ports.

The reading ports L1.0 to L1.n are connected to a voltage detector A1.

According to the invention, during the interrogation of an element 1.0 for example, to make the influence of the other elements ineffective (these other elements being 1.1 to 1.n according to this example) the different reading access ports L1.0 to L1.n are connected to a voltage source CS by a resistor R in such a way that the reading ports L1.0 to L1.n are at the potential v ($v=0$ volt for example).

Thus, a current Io flows in the elements (1.0). By contrast, it is sought to obtain a situation where there is no current in the other elements, so that they are incapable of generating a parasitic signal that would get added to the signal of the selected head. To this end, it is adequate to ensure that there is a zero voltage at their terminals. The potential of the row is brought to the potential v by means of a resistor R, connected to a voltage generator Vr ($Vr<0$). The foregoing condition is obtained with $v=0$ volt, when:

$$V_0/r = V_r/R$$

r being the resistive element 1.0 to 1.n.

The invention is more particularly applicable to the reading of magnetoresistive heads, the resistance of which varies with their state of magnetization.

According to a preferred embodiment, the resistive (magnetoresistive) elements are arranged in the form of a matrix comprising m rows, each row comprising n elements. A preamplifier (detector) A1 is provided for each row, or else there is provision for a common preamplifier (detector A1) that can be switched over to the different rows.

The analysis of the working of the device of FIG. 1 brings out the fact that the reading signal appears as a small variation $\Delta r$ in the resistance of the magnetoresistance r. This is expressed by a small voltage disequilibrium. The preamplifier A1 amplifies this signal.

With the following notations:

$\Delta r/r$ = variation in magnetoresistance at saturation $\eta$ = effectiveness of the magnetic coupling (or ratio between the amplitude of the re-read signal and the amplitude at saturation).

n = number of elements per row.

The input signal of the preamplifier A1

$$ve \approx -\frac{V}{n+1} \eta \frac{\Delta r}{r}$$

The signal at the output of the preamplifier A1 is evidently:

$$V_S = A\, ve$$

The gain A of the preamplifier may be very high: the continuous component has been eliminated and the signal can use a wide part of the dynamic range of the amplifier.

With respect to the passband of the preamplifier A1, if D is the bit rate of the reading head, S is the oversampling factor (number of signal samples per re-read bit) and m x n the is total number of elements 1.0 to 1.n, then the frequency of the sample per reading preamplifier is:

$$\frac{D \times S}{m}$$

The passband of the reading amplifier must be greater than the reading rate of the successive columns, so as not to introduce any crosstalk by the mixing of successive samples. A passband of the order of 5 times this value will be chosen:

$$B = 5 \times \frac{D \times S}{m}$$

With regard to the noise level, if vb is the noise voltage (in $V/\sqrt{Hz}$) at the input of the preamplifier, while the effective noise voltage generated by the amplifier is given by:

$$vb_{eff} = vb \times \sqrt{B}$$

If it is assumed that the above is the preponderant noise parameter, then the signal-to-noise ratio is expressed by:

$$\frac{S}{B} = 20\log\left[\frac{V}{n+1}\eta\frac{\Delta r}{r} \times (vb^2 \times 5D.S/m) - \frac{1}{2}\right]$$

The nature of the system is such that it is not possible strictly to ensure the stability of the value of r. Nor is it possible to ensure that r will be identical for all the magnetoresistive elements. In the case of a variation $\Delta r/r$ of one of the elements, the mean voltage appearing at the input of the amplifier, and hence at the terminals of the non-selected elements, is:

$$v\frac{\Delta r}{r}\cdot\frac{1}{n+1}$$

and the crosstalk that may result from this situation is given by:

$$\frac{\Delta r}{r}\cdot\frac{1}{n+1}$$

If a variation of elements is less than 10%, then the crosstalk will be of the order of −40 dB (for $n \geq 10$).

If the variation is greater, or if temperature variations appear, then it is possible to make $v_r$ vary individually for each interrogation of an element.

Figure 2:
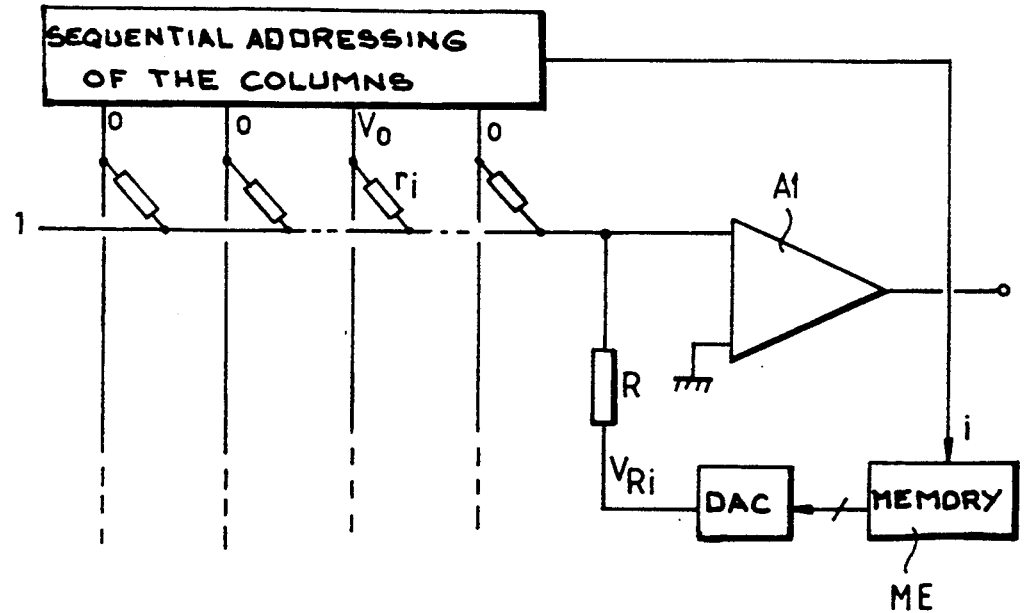
FIG. 2 shows an exemplary embodiment of the device according to the invention in greater detail.

FIG. 2 shows a circuit that can be used to generate n different values for $V_r$, each corresponding to the interrogation of a particular element. These voltages Vri, represented by binary numbers, are stored in a memory ME and are presented one after the other, at the appropriate time, to the input of a digital-analog converter (DAC) which converts them into electrical voltages.

Figure 3:
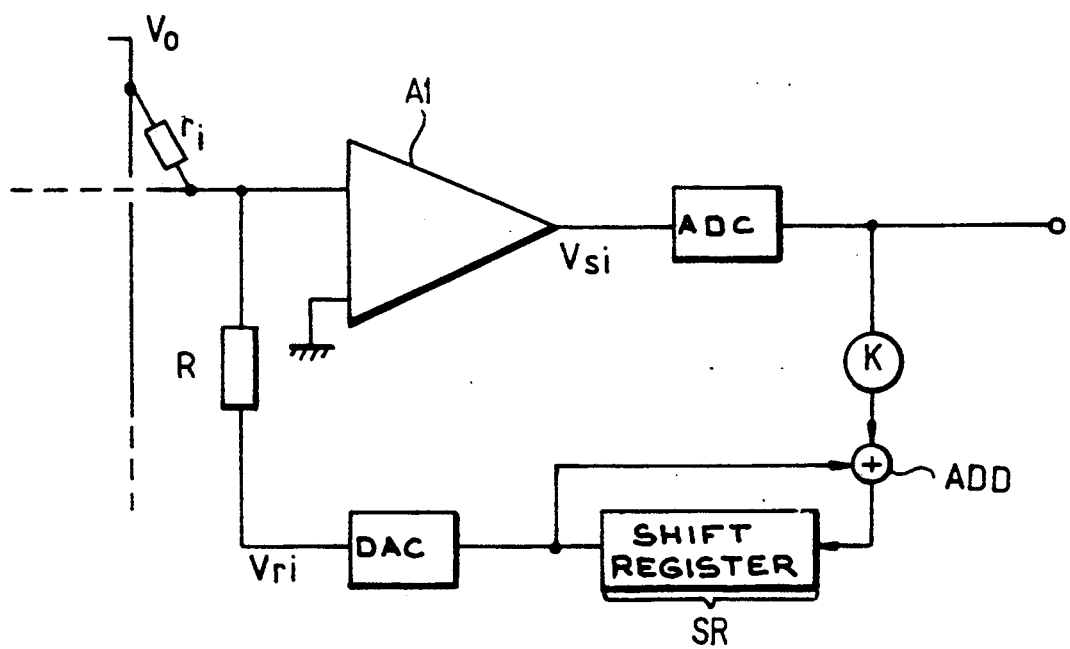
FIG. 3 shows an alternative embodiment of the device of FIG. 2.

In order to ensure that the mean voltages at output will always be well compensated for, even if drifts occur, the previous circuit is inserted into a feedback loop that can be used to modify the value of the compensation voltage as a function of the residue of mean voltage at output of the detection circuit A1. This loop may be of the type shown in FIG. 3. The circuit is herein constituted by the detection circuit A1 (read amplifier) of an analog-digital converter ADC, a multiplier K by a coefficient K ($k<0$), an n-state shift register SR looped by an adder ADD and, finally, a digital-analog converter DAC.

As a consequence of the multiplexed operation of the head, the ADC successively receives the voltages Vs1, Vs2 ..., Vsi ... Vsn corresponding to the signals delivered by the n interrogations of a row. If only the element i is considered, the operation of the circuit can be described by the following equations:

$$V_{sk+1} = V_{ek+1} + V_{rk+1}$$

(the amplifier is assumed to be a unity gain amplifier)

$$V_{rk+1} = KV_{sk} + V_{ek}$$

($v_{rk}$ updating equation)

where Ve is the voltage delivered by the head i when there is no compensation
Vs is the input voltage of the ADC and
Vr is the compensation voltage delivered by the DAC
and the indices K, K+1 ... are successive sampling instants.

The response of the circuit is expressed by the following equation with z as an unknown quantity.

$$\frac{Vs}{Ve} = \frac{1 - z^{-1}}{1 - (1+K)z^{-1}}$$

If K is negative, the circuit behaves like a first-order high-pass filter. Any continuous component present at the input is therefore eliminated.

The cut-off frequency of the filter depends on K. It will be chosen so as to be low enough to eliminate the continuous component and its slow variations without attenuating the low frequency components of the reading signal.

In fact, this process can be applied sequentially to the signals of the n elements of a row: the role of the shift register is to deliver the compensation voltage Vri at the instant of selection of an element i, and then to store the new value of Vri during the n clock strokes, until the element i is read again. The n signals are thus processed in a time-multiplexed manner.

The circuit presented herein is a first-order filter. In certain applications, it may be desirable to set up a higher order system. This, naturally, raises no difficulty if the standard techniques of synthesis of digital filters are used.

This circuit therefore enables the multiplexed operation of a matrix of magnetoresistive elements with a high output level and a good signal-to-noise ratio. The continuous component is eliminated, and the crosstalk is cancelled by means of a compensation circuit operating in a time-multiplexed mode. This circuit can be applied notably to the reading of a magnetic head comprising a matrix of n×m elementary magnetoresistive heads.

It is quite clear that the above description has been given purely by way of an example. Its application notably to the reading of magnetoresistive heads has been described solely in order to illustrate the description.

What is claimed is:

1. A device for the reading of a set of resistive elements, each comprising an interrogation port that can be connected to an electrical interrogation source and a reading port connected to a voltage detection circuit that enables the resistance of each resistive element to be measured, wherein:
    the interrogation circuit successively applies an interrogation potential to the interrogation port of each resistive element while it applies a reference potential to the other resistive elements;
and wherein:
    said device comprises at least one voltage stabilization circuit that is connected to the reading ports of the resistive elements and that keeps these ports substantially at the reference potential.

2. A reading device according to claim I, wherein the reference potential is a zero value potential.

3. A reading device according to claim 1, wherein the stabilization circuit comprises a voltage source and a resistor.

4. A reading device according to claim 1, also comprising a memory by interrogation of an element, said memory recording the value of the detected voltage at each interrogation of a head and, during the next interrogation of the same element, controlling the stabilization circuit in such a way that it applies, to the reading ports, a voltage substantially equal to the previously detected voltage.

5. A reading device according to claim 1, wherein the resistive elements are magnetoresistive reading heads.

6. A reading device according to claim 5, wherein:
    the magnetoresistive heads are arranged in matrix form in rows and columns, the interrogation ports of the heads of a column being connected to a column wire, the reading ports of the heads of a row being connected to a row wire;
    the interrogation circuit successively applies the interrogation potential to each column wire while it applies the reference potential to the other column wires;
    a reading circuit is connected to a row wire;
    the voltage stabilization circuit is connected to the different row wires.

7. A reading device according to claim 6, comprising as many voltage stabilization circuits as there are row wires, each stabilization circuit being connected to a row wire.

8. A reading device according to claim 7, comprising a compensation circuit that can be used, at each interrogation, to modify the value of the voltage applied to the reading ports by the stabilization circuit as a function of the detected voltage, and to record the voltage thus modified.

* * * * *